Feb. 21, 1939.                E. JULLMANN                2,148,124

HOLDER FOR TRANSPARENT PICTURES

Filed May 5, 1937

INVENTOR
Ernst Jullmann
BY
Haseltine, Lake & Co.
ATTORNEYS

Patented Feb. 21, 1939

2,148,124

UNITED STATES PATENT OFFICE 2,148,124

HOLDER FOR TRANSPARENT PICTURES

Ernst Jullmann, Frankfort-on-the-Main, Germany, assignor to Carl Neithold, Frankfort-on-the-Main, Germany, a German firm Application May 5, 1937, Serial No. 140,904
In Germany December 28, 1936

4 Claims. (Cl. 40—154)

This invention has for its object the provision of an improved holder for transparent pictures.

Transparent pictures, such as diapositive films or the like and printed or painted foils have hitherto been placed between glass plates for protection and storage, and for projecting in projection apparatus, the said glass plates being connected together by a border of adhesive paper, or like material overlapping on both sides. In such cases, there is the danger of the film being displaced if handled by an unskilled person. The work of producing such frames is moreover complicated and the writing of inscriptions such as titles is difficult. Replacement of the inserted picture necessitates destruction of the border in each case.

Now, it has been found that small photographs, film sections and the like may be arranged uniformly, even with little practice, for the purpose of storage and more especially for guiding in examining or viewing devices, while they may be readily exchanged and provided with inscriptions by retaining them in a predetermined manner between a mask and a glass plate by means of slots provided in the mask, and by enclosing them in a two-part frame. If necessary the mask may first be covered by a further plate or the like. One part of the frame comprising part of the surrounding border is formed with projections fitting in corresponding apertures or recesses in the border of the other part of the casing. If necessary, one of the surfaces having the viewing apertures may be cut away to such an extent that the covering plate is only surrounded by a narrow border. The frame of the holder may comprise a plate member of sectional U-shape at three of its edges thereby forming three sides of the frame into which the glass plates with the film between them may be fitted from the open end, whereupon the frame is closed by the second part thereof which is also of U-section. For special purposes, the frame may also be formed by two half-rings of U-section if the glass plates be, for example, circular.

If desired a plurality of such frames may be connected in juxtaposition to each other, for example for cinematograph projection and the like.

Figure 1:
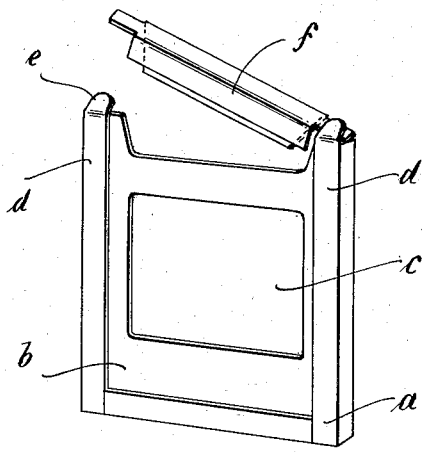
Figure 2:
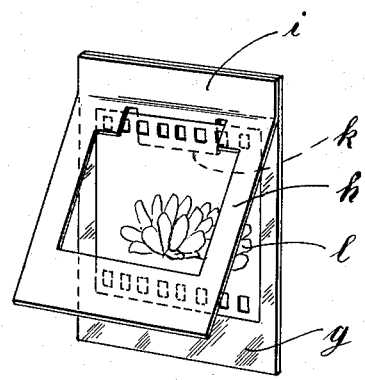
Figure 3:
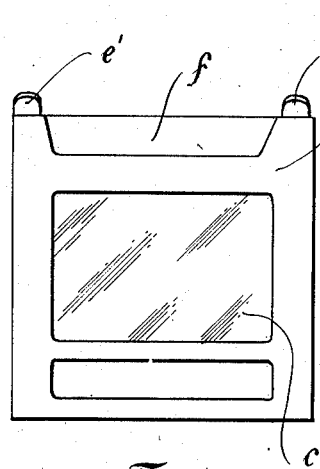
Figure 4:
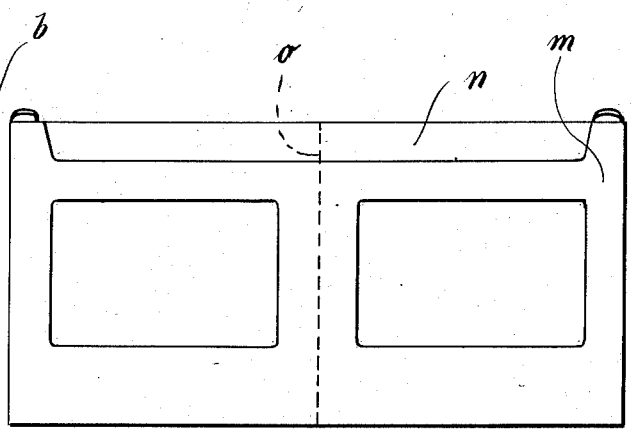

A number of constructional forms of holders according to the invention are illustrated in the accompanying drawing, in which:

Figure 1 is an elevational view of a holder in the form of a narrow slide, one of the two walls having a picture aperture, while the opposite wall is cut away to such an extent that it forms only a narrow frame, Figure 2 shows a cover plate with a film fitted therein, and a mask secured to the cover plate, Figure 3 shows the closed holder seen from the front, and Figure 4 shows another constructional form, for example for stereoscopic pictures.

According to Figure 1, $a$ is the U-shaped guide frame of the holder and $b$ the rear wall or plate member thereof having a picture aperture $c$. The ends of the front walls of the side members $d$ are extended to form lugs $e$ which may be bent over in order to hold fast the free part of the frame $f$ after the insertion from above of the covering plate with the film and the mask. The side faces of the part $f$ lie in a plane on the one hand with the side members $d$ and on the other hand with the plate surface $b$, which for this purpose is formed with a corresponding recess above the picture aperture, so that after assembly the holder is surrounded by a smooth surface with the exception of the turned-over lugs $e$. These lugs, however, do not interfere in the passing of the device through a projection apparatus.

The glass plate $g$ according to Figure 2 is connected at its upper edge with a mask $h$, for example by an adhesive, while a part of the upper edge of the mask $h$ is gummed to the glass plate. The film $i$ inserted from below thus has abutments laterally of this gummed section, and even when manipulated by an unskilled hand accurate adjustment of the edges of the film parallel to the edges of the glass plate is rendered easy.

According to Figure 3, the lugs $e$ and $e'$ are provided on the centre section of the U-section frame sides, so that they bend towards the centre of the part $f$, that is, on the centre section thereof. Below the picture aperture $c$, a further recess is provided, through which, for example, parts of the mask provided with inscriptions are visible. Instead of the last-mentioned recess, the casing of the slide may have an etched surface or the like permitting of inscription and of readily finding the front side of the holder in dark projection rooms.

In the constructional form according to Figure 4, the slide or frame plate member $m$ is subdivided by a small partition $o$ into two compartments, both of which are together covered and closed by the part $n$.

The manipulation is such that the film section $i$, for example a colour film, is first inserted so far under the mask $h$ that it is stopped by the points of inflection of the side portions. The mask $h$ is now pressed down and covered by a second glass plate, whereupon both plates are fitted from above with their contents in the U-guides of the side members of the body $a$. The free part $f$ is then placed over the free edge of the plate, and when it lies flush is made fast with the edges of the side members of the main body by bending over the lugs $e$ and $e'$ respectively. The holder now forms a small closed casing the front surface of which has the recess $c$ corresponding to the mask, the rear surface of which recess is merely framed by the narrow members of the main and of the detachable frame parts.

As will be seen from Figure 1, one of the two side members of the part $f$ is deeper than the other. It has been found that in this way the assembly of the parts, which are sometimes very small, is substantially facilitated.

If plates are to be inserted into the holder instead of films, the use of two covering plates is dispensed with. In this case, covering by a mask and over this the arrangement of a covering plate is sufficient. In many cases, covering merely with the mask or with a protecting plate of transparent artificial substances is enough. The closed holder protects the photograph from damage, and permits of accommodating it in a similar manner to microscopic preparations in cases, and above all enables ready insertion and manipulation when used in a projection apparatus or the like. The frames may also be readily opened in darkness or under weak illumination and their contents changed.

For the frame body itself, various materials may be used, such as sheet metal (preferably sheet aluminium, since this may readily be written on without etching), or a moulded material, such as artificial resin. Instead of glass plates, plates of artificial resin provided with recesses may also be used, which simply permit of holding the film or the like fast in the manner of masks. Finally, the separate frame parts may also be secured together by clamping, and instead of the holder opening at one narrow side, one of the main walls may be adapted to open, in particular when the frame is made of artificial resin.

What I claim and desire to secure by Letters Patent of the United States is:—

1. A holder for transparent pictures comprising a rectangular plate member shaped to form a picture aperture and having three of its edges turned over to form three sides of a frame with inwardly facing grooves to receive the picture, and a member of U-section adapted to be secured to the plate member to form the fourth side of the frame, said plate member being provided with an outwardly extending lug portion adapted to be bent over to transversely enclose a portion of said member of U-section to maintain the frame in assembled position.

2. A holder for transparent pictures comprising a rectangular plate and a U-section closing member, the said plate having three of its edges turned over to form three sides of a frame with inwardly facing grooves to receive the picture and being shaped to form a picture opening and to form at its fourth edge a recess to receive one side of the said closing member which member is adapted to be retained in position by lugs formed on the plate member.

3. A holder for transparent pictures comprising a rectangular plate and a U-section closing member, the said plate having three of its edges turned over to form three sides of a frame with inwardly facing grooves to receive a plurality of pictures, said plate having a plurality of picture openings and provided with a recess at its remaining edge to receive one side of said closing member, said closing member being adapted to be retained in position by lugs formed on the plate member.

4. A holder for transparent pictures comprising a rectangular plate member and a U-section closing member, said plate member having three of its edges turned over to form three sides of a frame with inwardly facing grooves adapted to receive a plurality of aligned pictures, said plate member having a plurality of picture openings and also provided with a recess at its remaining edge to receive one side of said closing member, said plate member being provided with an outwardly extending lug portion adapted to be bent over to transversely enclose a portion of said closing member of U-section to maintain the frame in assembled position.

ERNST JULLMANN.